(12) United States Patent
Lepp et al.

(10) Patent No.: US 12,350,528 B2
(45) Date of Patent: Jul. 8, 2025

(54) FALL-PROTECTION APPARATUS WITH MULTIMODAL INDUCTIVE SENSING

(71) Applicant: 3M INNOVATIVE PROPERTIES COMPANY, St. Paul, MN (US)

(72) Inventors: Jonathan J. Lepp, Eagan, MN (US); Scott E. Brigham, Maplewood, MN (US); Nathan W. Safe, Red Wing, MN (US); Stephen D. Shaver, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 852 days.

(21) Appl. No.: 17/624,912

(22) PCT Filed: Jul. 2, 2020

(86) PCT No.: PCT/IB2020/056252
§ 371 (c)(1),
(2) Date: Jan. 5, 2022

(87) PCT Pub. No.: WO2021/005467
PCT Pub. Date: Jan. 14, 2021

(65) Prior Publication Data
US 2022/0266075 A1     Aug. 25, 2022

Related U.S. Application Data

(60) Provisional application No. 62/872,545, filed on Jul. 10, 2019.

(51) Int. Cl.
A62B 35/00     (2006.01)
A62B 35/04     (2006.01)
(Continued)

(52) U.S. Cl.
CPC .......... *A62B 35/0037* (2013.01); *G01V 3/101* (2013.01); *G08B 21/0446* (2013.01);
(Continued)

(58) Field of Classification Search
CPC ............ A62B 35/0018; A62B 35/0037; A62B 35/0043; A62B 35/0093; A62B 35/04; G01V 3/101; G08B 21/0446
(Continued)

(56) References Cited

U.S. PATENT DOCUMENTS 3,744,044 A * 7/1973 Vosteen ............. H03K 17/9502
340/572.5
4,511,123 A * 4/1985 Ostrobrod ................ A62B 1/10
254/378

(Continued)

FOREIGN PATENT DOCUMENTS

CN    106237562     12/2016
JP    2007044166     2/2007
(Continued)

OTHER PUBLICATIONS

3M DBI-SALA Nano-Lok Wrap Back Self-Retracting Lifeline, 1 page.
(Continued)

*Primary Examiner* — Brady W Frazier
(74) *Attorney, Agent, or Firm* — Kenneth B. Wood

(57) ABSTRACT

A fall-protection apparatus comprising at least one connector that comprises a resonant-frequency-shifting inductive sensing unit that is configured to detect whether the connector appears to be connected to a first item and is further configured to detect whether the connector appears to be connected to a second, different item.

18 Claims, 9 Drawing Sheets

(51) Int. Cl.
*G01V 3/10* (2006.01)
*G08B 21/04* (2006.01)

(52) U.S. Cl.
CPC ....... *A62B 35/0018* (2013.01); *A62B 35/0043* (2013.01); *A62B 35/0093* (2013.01); *A62B 35/04* (2013.01)

(58) Field of Classification Search
USPC ........................................................ 182/232
See application file for complete search history.

(56) References Cited

U.S. PATENT DOCUMENTS

| | | | |
|---|---|---|---|
| 5,186,289 A * | 2/1993 | Wolner | F16D 59/00 |
| | | | 188/65.1 |
| 7,843,349 B2 | 11/2010 | Rohlf | |
| 8,256,574 B2 | 9/2012 | Griffiths | |
| 8,430,206 B2 | 4/2013 | Griffiths | |
| 8,430,207 B2 | 4/2013 | Griffiths | |
| 9,480,866 B2 | 11/2016 | Pollard | |
| 9,488,235 B2 | 11/2016 | Casebolt | |
| 10,258,814 B2 | 4/2019 | Casebolt | |
| 2005/0039981 A1* | 2/2005 | Wooster | A62B 1/10 |
| | | | 182/75 |
| 2006/0113147 A1* | 6/2006 | Harris | A62B 35/0093 |
| | | | 182/3 |
| 2015/0265860 A1 | 9/2015 | Kennedy | |
| 2016/0107007 A1 | 4/2016 | Pollard | |
| 2022/0404388 A1* | 12/2022 | Sepe | G01P 15/09 |

FOREIGN PATENT DOCUMENTS

| | | |
|---|---|---|
| JP | 3194445 | 10/2014 |
| WO | WO 2018-071646 | 4/2018 |
| WO | WO 2019-012454 | 1/2019 |
| WO | WO 2019-157007 | 8/2019 |
| WO | WO 2020-065457 | 4/2020 |
| WO | WO 2020-194121 | 10/2020 |

OTHER PUBLICATIONS

3M EMI EMC Materials Brochure, 4 pages.
Delta—Fall Protection Harness, DBI-SALA, 6 pages.
International Search Report for PCT International Application No. PCT/IB2020/056252, mailed on Sep. 21, 2020, 3 pages.

* cited by examiner

FALL-PROTECTION APPARATUS WITH MULTIMODAL INDUCTIVE SENSING

BACKGROUND

Fall-protection apparatus, systems, and methods of using such apparatus and systems, have found wide use in applications such as building construction and the like.

SUMMARY

In broad summary, herein is disclosed a fall-protection apparatus comprising at least one connector that comprises a resonant-frequency-shifting inductive sensing unit that is configured to detect whether the connector appears to be connected to a first item and is further configured to detect whether the connector appears to be connected to a second, different item. Systems and methods that use such an apparatus are also disclosed. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "first" and "second" may be used in this disclosure, it should be understood that those terms are used in their relative sense only, unless otherwise noted.

The term "configured to" and like terms is at least as restrictive as the term "adapted to", and requires actual design intention to perform the specified function rather than mere capability of performing such a function.

DETAILED DESCRIPTION

Figure 1:
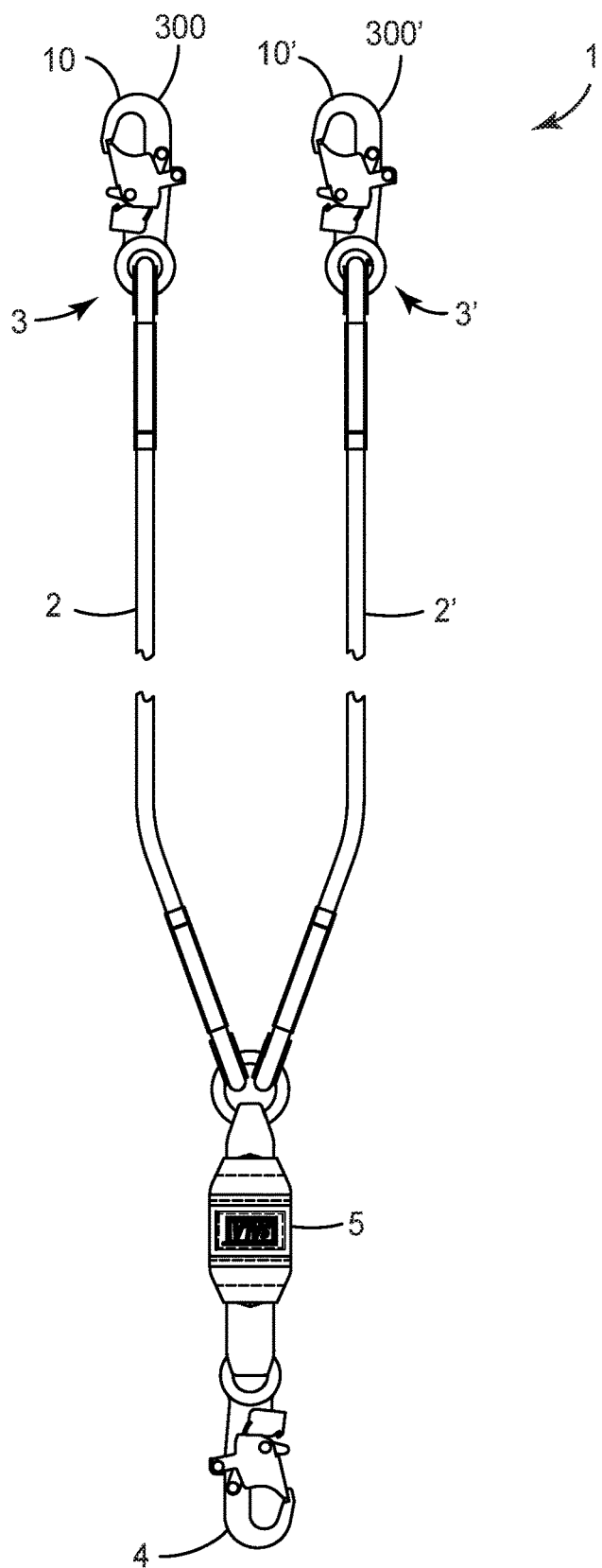
FIG. 1 is a side view of an exemplary fall-protection apparatus.
Figure 2:
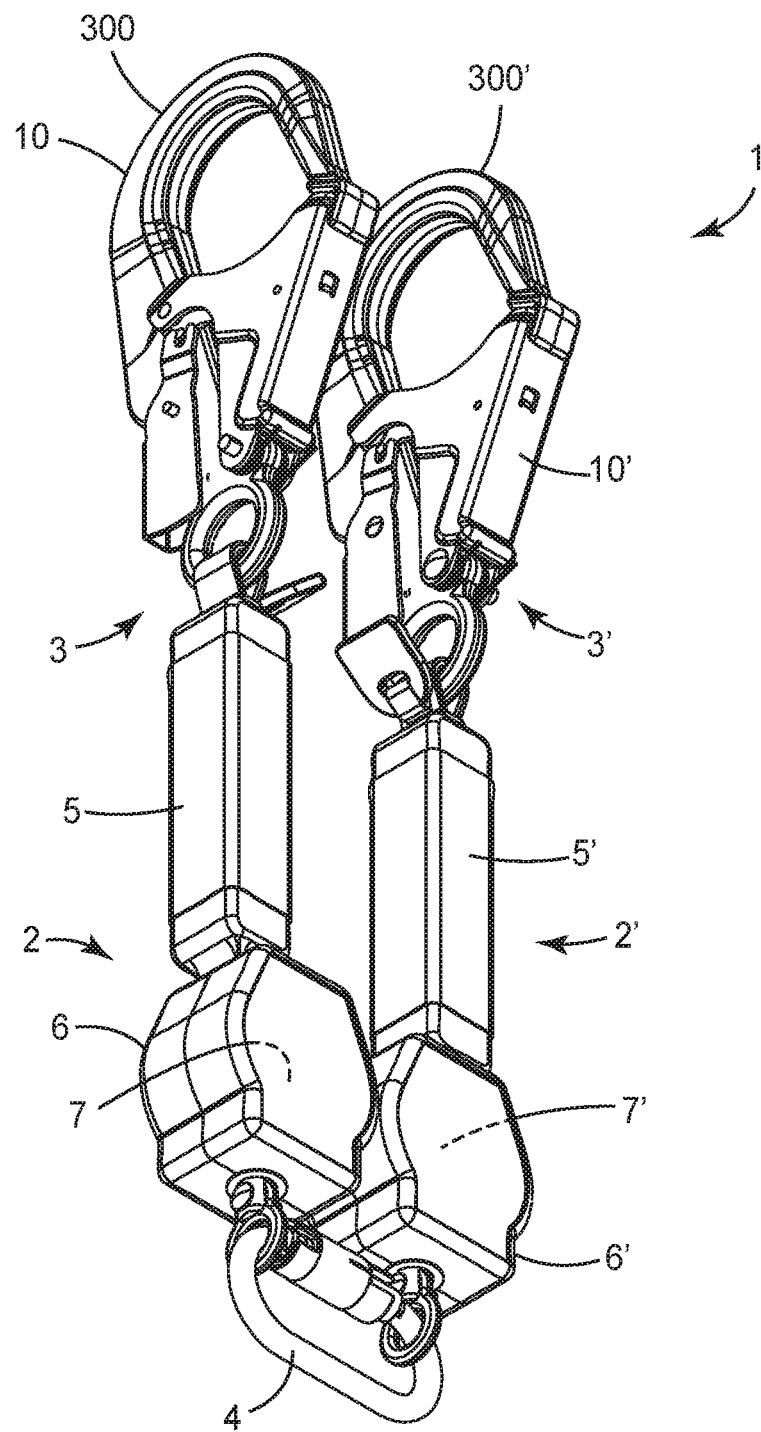
FIG. 2 is a side perspective view of another exemplary fall-protection apparatus.
Figure 3:
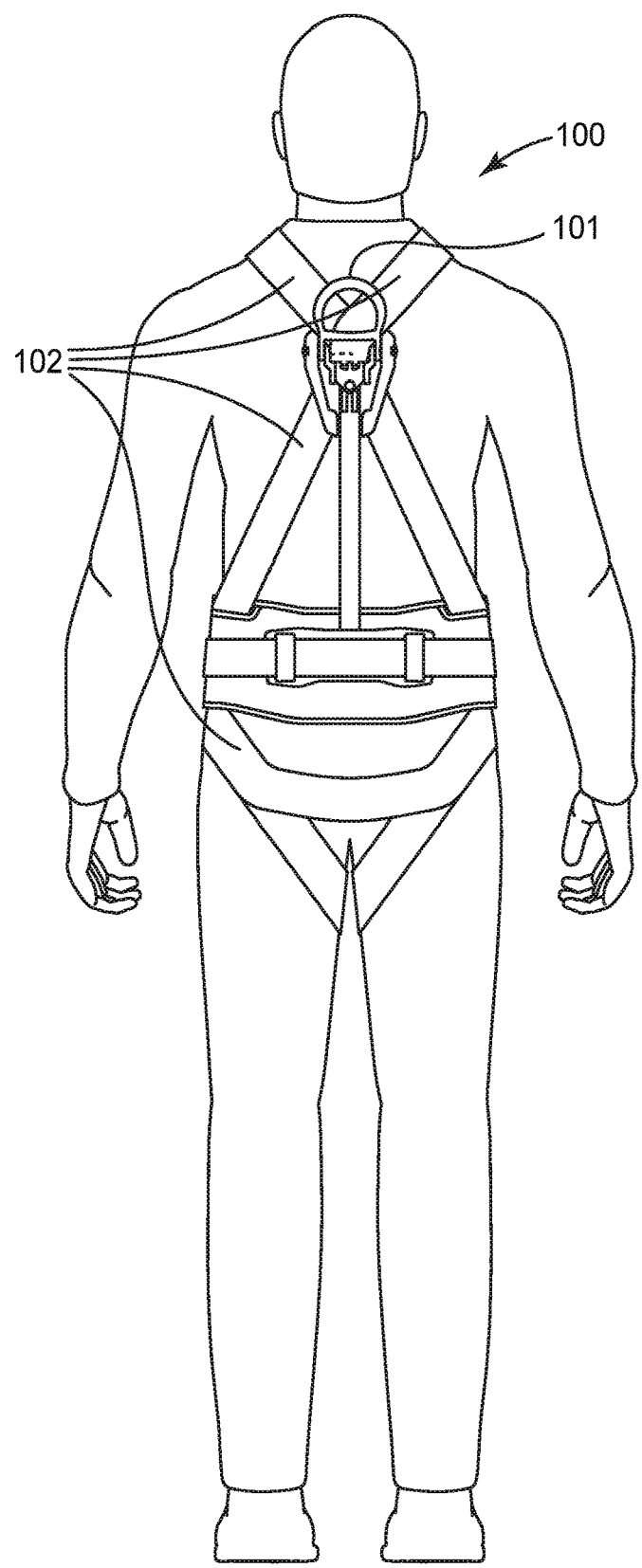
FIG. 3 is a rear view of an exemplary fall-protection harness as worn by a human user.

As depicted in exemplary embodiment in FIGS. 1 and 2, disclosed herein is a fall-protection apparatus 1. Apparatus 1 is configured to be used with a fall-protection harness 100 (as shown in exemplary embodiment in FIGS. 3 and 4) that is wearable by a human user; apparatus 1 and harness 100 collectively form a fall-protection safety system. Fall-protection apparatus 1 comprises at least one safety line 2, with the term safety line denoting a line that is configured to bear the weight of a human user and is further configured to withstand any momentarily higher force resulting e.g. from the arresting of a fall of the human user. The term line broadly encompasses any cable, strap, webbing, rope, lanyard, or the like. In various embodiments such a line may be e.g. round or flat in cross-section, may be made of e.g. metal, of an organic polymeric material (such as e.g. the material available under the trade designation DYNEEMA), and so on.

Apparatus 1 further comprises at least one connector 10. In many embodiments, a connector 10 will be provided at a distal end 3 of safety line 2, as in the exemplary arrangements of FIGS. 1 and 2. In some embodiments, connector 10 may be non-removably secured to end 3 of safety line 2. In other embodiments, connector 10 may be removably secured to end 3 of safety line 2, for example by use of the arrangements disclosed in U.S. Provisional Patent Application No. 62/737,214, which is incorporated by reference in its entirety herein.

In some embodiments, a fall-protection apparatus 1 may be of the general type depicted in FIG. 1. The exemplary apparatus of FIG. 1 (often referred to as a twin-leg lanyard) comprises first and second safety lines 2 and 2', stemming from a common portion and bearing connectors 10 and 10' at respective ends 3 and 3' of the safety lines. Exemplary apparatus 1 of FIG. 1 also comprises an energy absorber 5 (often referred to as a shock absorber, and comprising e.g. a tear strip or the like) that is configured to dissipate energy in the event of a user fall. It will be appreciated that such an apparatus may vary widely in specific form and arrangement. For example, each line 2 and 2' may include a separate shock absorber rather than the apparatus having a single absorber in a common portion as in FIG. 1. In some embodiments no shock absorber may be present. In some embodiments the apparatus may be a single-leg design rather than a twin-leg design (i.e. with only one safety line 2 rather than two such lines). The arrangements disclosed herein will thus be understood to be applicable, in various embodiments, to any such lanyards (e.g. those referred to as energy-absorbing lanyards, shock-absorbing lanyards, positioning lanyards, tie-back lanyards, and so on). Whatever the specific design, any such fall-protection lanyard will comprise at least one coupler 4 (of any suitable design) that is configured to couple the lanyard to a fall-protection harness 100 e.g. of the general type shown in FIGS. 3 and 4. Often, such a harness 100 may be equipped (along with various straps 102, pads, and ancillary components) with one or more coupling points (e.g. D-rings 101, as shown in exemplary embodiment in FIGS. 3 and 4), to which coupler 4 may be attached in order to couple the lanyard to the harness.

In some embodiments, a fall-protection apparatus 1 may be of the general type depicted in FIG. 2 (this type of apparatus is typically referred to as a self-retracting lifeline ("SRL") for reasons explained below). The exemplary apparatus of FIG. 2 comprises first and second safety lines 2 and 2', stemming from a common portion and bearing connectors 10 and 10' at respective ends 3 and 3' of the safety lines. Fall-protection apparatus of this general type comprise at least one brake, energy absorber (e.g. shock absorber), or the like, configured to controllably arrest the motion of a user, e.g. in a gradual manner rather than in an abrupt (e.g. high g-force) manner. In the particular design of FIG. 2, first and second brakes 7 and 7' are provided and are respectively configured to arrest the motion of safety lines 2 and 2'.

In further detail, a self-retracting lifeline may comprise at least one safety line 2 that can be unwound from a housing 6 that is securable by a coupler 4 to a harness 100 (noting that the coupler 4 of FIG. 2 is a different design from than that of FIG. 1). A distal end 3 of safety line 2 is connectable by connector 10 to any desired anchorage as discussed in detail later herein. Housing 6 comprises a reel (drum) to which a proximal end of safety line 2 is attached. Safety line 2 can be unwound from the reel and thus extended from housing 6 as a user moves away from the anchorage to which end 3 of line 2 is attached, with the reel being biased so that the reel retracts safety line 2 back into housing 6 and rewinds the safety line onto the reel as the user moves toward the anchorage (hence the term "self-retracting").

In some embodiments (e.g. as in the exemplary arrangement of FIG. 2), an SRL (e.g. housing 6 thereof) may comprise a brake that, in the event of a user fall (e.g. upon rapid unwinding of safety line 2) arrests the user's fall by bringing the rotation of the line-bearing reel to a halt in a controlled (e.g. gradual) manner. In some embodiments such a brake may be a friction brake e.g. of the general type well known to artisans in the field. In some embodiments such a brake may rely at least in part on a braking force generated by an electromagnetic field, e.g. in the general manner described in U.S. Pat. No. 8,511,434.

In some embodiments, an SRL may comprise an energy absorber (often referred to as a shock absorber) in addition to a brake (as with shock absorbers 5 and 5' of FIG. 2). However, in some embodiments an SRL may depend solely on one or more shock absorbers with e.g. no brake being present. In other embodiments an SRL may depend on one or more brakes (e.g. friction or electromagnetic brakes) with no shock absorber being present. It will thus be appreciated that a wide variety of self-retracting lifelines are available. Fall-protection apparatus such as self-retracting lifelines and components and functioning thereof are described in various aspects in U.S. Pat. Nos. 7,843,349, 8,256,574, 8,430,206, 8,430,207, and 9,488,235. In some embodiments a self-retracting lifeline will meet the requirements of ANSI Z359.14-2012.

Figure 11:
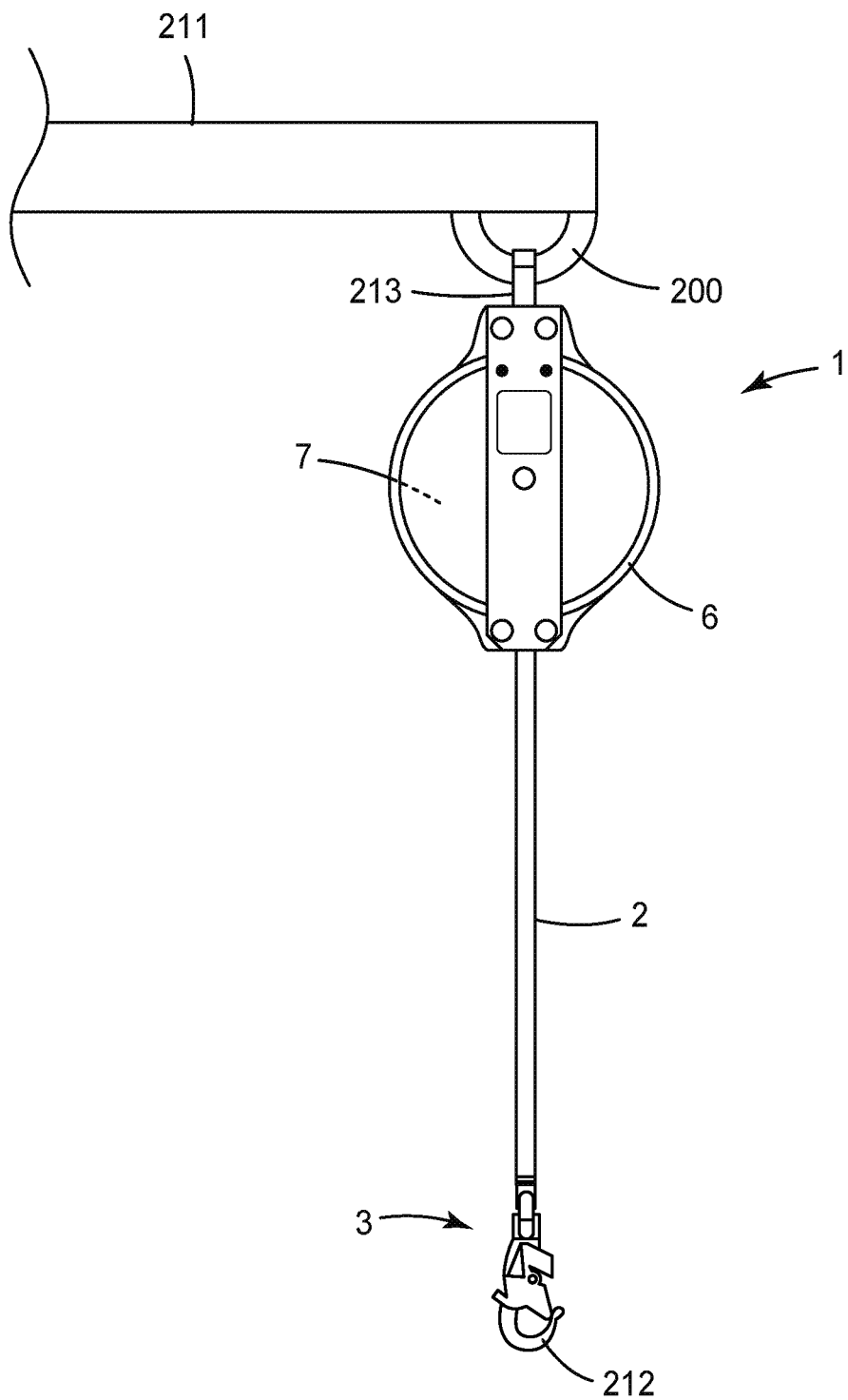
FIG. 11 is a side view of an exemplary fall-protection apparatus coupled to an anchorage of a worksite.

The self-retracting lifeline 1 depicted in FIG. 2 is of a type in which, during use of the SRL, housing 6 (and brake 7 thereof) is coupled to, and remains in close proximity to, the harness of the user. SRLs of this general type are often referred to as "personal" SRLs. (An exemplary "non-personal" self-retracting lifeline is depicted in FIG. 11 and is discussed later herein). The exemplary personal SRL 1 of FIG. 2 is a twin-leg SRL, with two safety lines 2 and 2', two housings 6 and 6' (respectively comprising brakes 7 and 7'), two shock absorbers 5 and 5', and with connectors 10 and 10' at distal ends 3 and 3' of each safety line. In other embodiments, a personal SRL may be a single-leg SRL.

Thus in summary, a fall-protection apparatus 1 (whether a lanyard or a personal self-retracting lifeline) will comprise at least one safety line 2 and at least one connector 10. In some embodiments, connector 10 may be removably or non-removably secured to an end 3 of the safety line and may be configured to be connected to an anchorage of a worksite.

Figure 5:
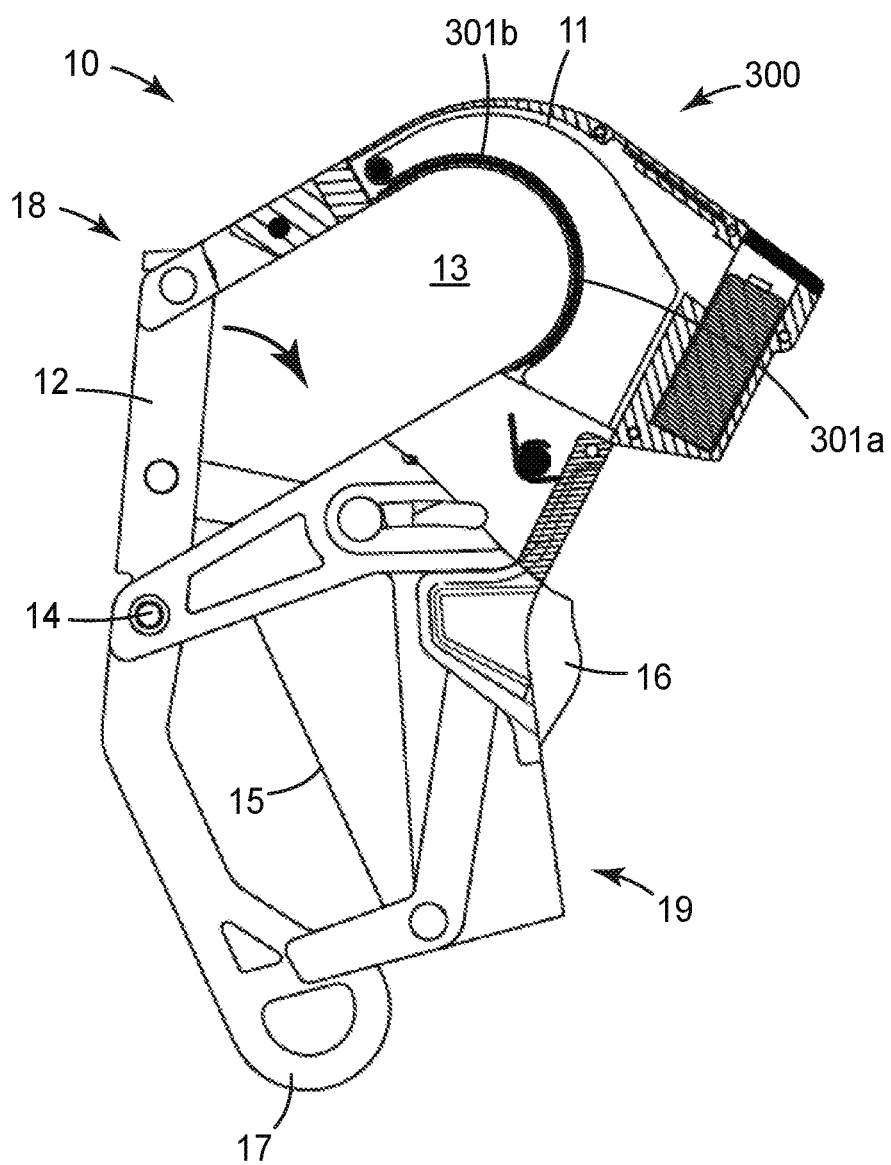
FIG. 5 is a side view of an exemplary connector comprising an exemplary inductive sensing unit.

A connector 10 may be of any suitable design. In some embodiments a connector 10 may be a carabiner. In some embodiments, a connector 10 may be a hook, e.g. a snap hook. An exemplary hook 10 is depicted in FIG. 5. Hook 10 comprises a generally curved portion 11 often referred to as a bowl, and a movable gate 12. In convenient embodiments, gate 12 may be mounted on a hinge 14 that allows gate 12 to open as indicated by the curved arrow of FIG. 5. Bowl 11 and gate 12 (and, in some instances, one or more other portions of hook 10) collectively define an opening 13 into which a portion of an item (e.g. an anchorage) may be passed, and remain, in the process of connecting the hook to the item. In the exemplary design of FIG. 5, hook 10 comprises a guard 16 that may be manipulated (e.g. pressed forward as a handle portion 19 of the hook is gripped by a user) to allow gate 12 to be opened. In some embodiments, gate 12 may be able to pivotally move about hinge 14 (i.e., to open) due to the pressure of an item that gate 12 is pressed against. In some embodiments, hook 10 may comprise a grip 15 that can be actuated (e.g. squeezed) to open gate 12 or to assist in the opening of gate 12. Once an item has passed through the open gate, gate 12 can then be allowed to close, so that a portion of the item is captured in opening 13. Hook 10 may comprise any suitable feature (e.g. an eyelet 17 as in FIG. 5) that allows hook 10 to be removably or non-removably attached to an end of a safety line.

In some embodiments a connector may be a locking hook that requires at least two consecutive, deliberate actions to open. It will be appreciated that hook 10 as shown in FIG. 5 is merely an exemplary design and that many arrangements are possible (in fact, hooks of other designs are visible in FIGS. 1, 2, 8, 10 and 11). In various embodiments, a connector as used herein may be any suitable type and/or shape of hook, including e.g. those connectors commonly referred to as snap hooks, locking hooks, rebar hooks, pelican hooks, form hooks, tower hooks, wrap-back hooks, comfort-grip hooks, and so on. In at least some embodiments, any such connector will be compliant with ANSI standard Z359.12-2009.

Whatever the specific design of connector(s) 10, a connecter 10 as disclosed herein will comprise a sensing unit 300 as indicated in generic representation in FIGS. 1 and 2 and 5. Sensing unit 300 is an inductive sensing unit, specifically, a resonant-frequency-shifting inductive sensing unit.

The term sensing unit denotes a device that comprises at least one inductive sensor that performs the actual sensing, along with any other items, components (e.g. hardware, software, power sources (e.g. a battery) and so on), and connections therebetween, to operate the sensor, to obtain data from the sensor, to process such data, to communicate the results of such processing, and so on. In some embodiments at least a portion of a sensing unit 300 may e.g. be partially or wholly encompassed within a housing, e.g. a molded plastic housing. In various embodiments any such sensing unit may be e.g. attached to a connector or to a portion thereof; may be provided at least partially within a cavity or space provided in the connector; or, in general, arranged in proximity to the connector in any suitable manner. However, the terms sensing unit and device broadly encompass any assembly of components that are operatively connected and/or in communication with each other so as to be able to perform the functions disclosed herein, whether all such components are e.g. co-located in a single physical housing or whether at least one or more such components are remotely located and are e.g. in wireless communication with some other component(s) of the sensing unit.

As disclosed herein, a sensing unit 300 is specifically configured (e.g., it comprises one or more sensors that are placed in appropriate physical locations of connector 10) so that it can perform the function of detecting a particular item, or a portion thereof, that is positioned within opening 13 defined by connector 10. However, a sensing unit 300 may also perform other functions, as will be made clear by discussions later herein.

A sensing unit 300 is configured to detect metal (which broadly encompasses metallic materials, metal-containing materials, and so on). The one or more sensors of sensing unit 300 rely on inductive sensing, specifically, resonant-frequency-shifting inductive sensing. By this is meant that sensing unit 300 is configured to detect changes in the resonant frequency of an LC (inductive-capacitive) resonant circuit that is provided by a sensor of the sensing unit, and to relate any such detected changes in resonant frequency to the presence of an item in opening 13 of connector 10. Resonant-frequency-shifting inductive sensing is discussed in detail in U.S. Provisional Patent Application No. 62/628,720, and in PCT application No. US2019/016768, both of which are incorporated by reference in their entirety herein. As discussed in the '720 and '768 documents, resonant-frequency-shifting inductive sensing encompasses approaches in which a change in the absolute value of the resonant frequency is monitored as well as approaches in which a rate of change of the resonant frequency is monitored.

The '720 and '768 documents provide detailed discussions of ways in which resonant-frequency-shifting inducting sensing may be performed and applied. It will be appreciated that many of the principles, arrangements and methods disclosed in these documents may be useful for purposes of the present application. For example, in some embodiments an inductive sensor of a sensing unit 300 may comprise an electronic circuit that includes first and second coils that are collectively arranged in a generally lemniscate form, with the first and second coils being wound in opposite directions relative to each other. As discussed in the '720 and '768 documents, such an arrangement may reduce the extent to which external magnetic fields may perturb the operation of the inductive sensor.

Also as discussed in the '720 and '768 documents, a sensing unit 300 may comprise multiple inductive sensors that are e.g. spaced along a periphery of an opening 13 of a connector, e.g. in order to enhance the ability to detect that a portion of an item is present within opening 13. For example, in the exemplary arrangement of FIG. 5, sensing unit 300 comprises a first sensor $301_a$ and a second sensor $301_b$, arranged along an edge of bowl 11 of connector 10. It will be appreciated that any number of individual inductive sensors, arranged in any suitable manner, may be used. In some particular embodiments, such an inductive sensor will not rely on a coil disposed around an elongate component of a connector (e.g. a body or gate of a snap hook, a loop portion of a carabiner, and the like) in the manner of e.g. U.S. Pat. No. 9,480,866.

The herein-disclosed arrangements may be contrasted e.g. with certain conventional inductive sensing units. Often, conventional sensing units may only be able to detect and report that a portion of some item is present within an opening of a connector. Such a sensing unit may not be able to detect, or report, the particular type of item that is present within the opening and thus may be unable to report what the connector is actually connected to. In fact, some inductive sensing units in the art are apparently configured to be "universally operable", e.g. they may be able to detect that an item of any of multiple possible types is present but are not configured with the ability to report the particular identity of the item. Such sensing units are essentially configured for single-mode operation, meaning that they can report only a single state of identification: the presence of some item. (The absence of any detection of an item may of course also be reported.)

In contrast, the herein-disclosed arrangements allow multimodal sensing. By this is meant that a sensing unit as disclosed herein is configured to detect whether a connector appears to be connected to a first item; and, is further configured to detect whether the connector appears to be connected to a second item that is different from the first item. In some embodiments, if the connector is detected as appearing to be connected to a first item, the sensing unit may report a first indication; and, if the connector is detected as appearing to be connected to a second, different item, the sensing unit may report a second indication that is different from the first indication. Of course, the sensing unit can also report at least a third indication, that the connector does not appear to be connected to either a first item or a second item.

In other words, a sensing unit of a fall-protection apparatus as disclosed herein can do more than simply report a binary, yes/no indication of whether or not a connector of the fall-protection apparatus appears to be attached to some item. Rather, the sensing unit is able to provide an indication of whether the connector appears to be attached to a first detectable item or appears to be attached to a second, different detectable item. Additionally, such a sensor can distinguish both of these from a situation in which the connector does not appear to be attached to any detectable item. In some embodiments, the sensing unit may be configured to detect, distinguish between, and/or report an indication of, the presence of additional, different items (e.g. a third detectable item, a fourth detectable item, etc.).

The reporting of an indication may be performed by an item or component that is physically resident on the sensing unit (e.g. that is within a housing that contains other components of the sensing unit). Or, the reporting may be performed by an item or component that is remote from the sensing unit and that receives a signal therefrom. For example, the sensing unit may e.g. wirelessly transmit a signal to a user's cell phone that causes the cell phone to report an indication. All such arrangements are encompassed by the herein-used terminology of an indication being reported (e.g. directly or indirectly) by a sensing unit.

Figure 4:
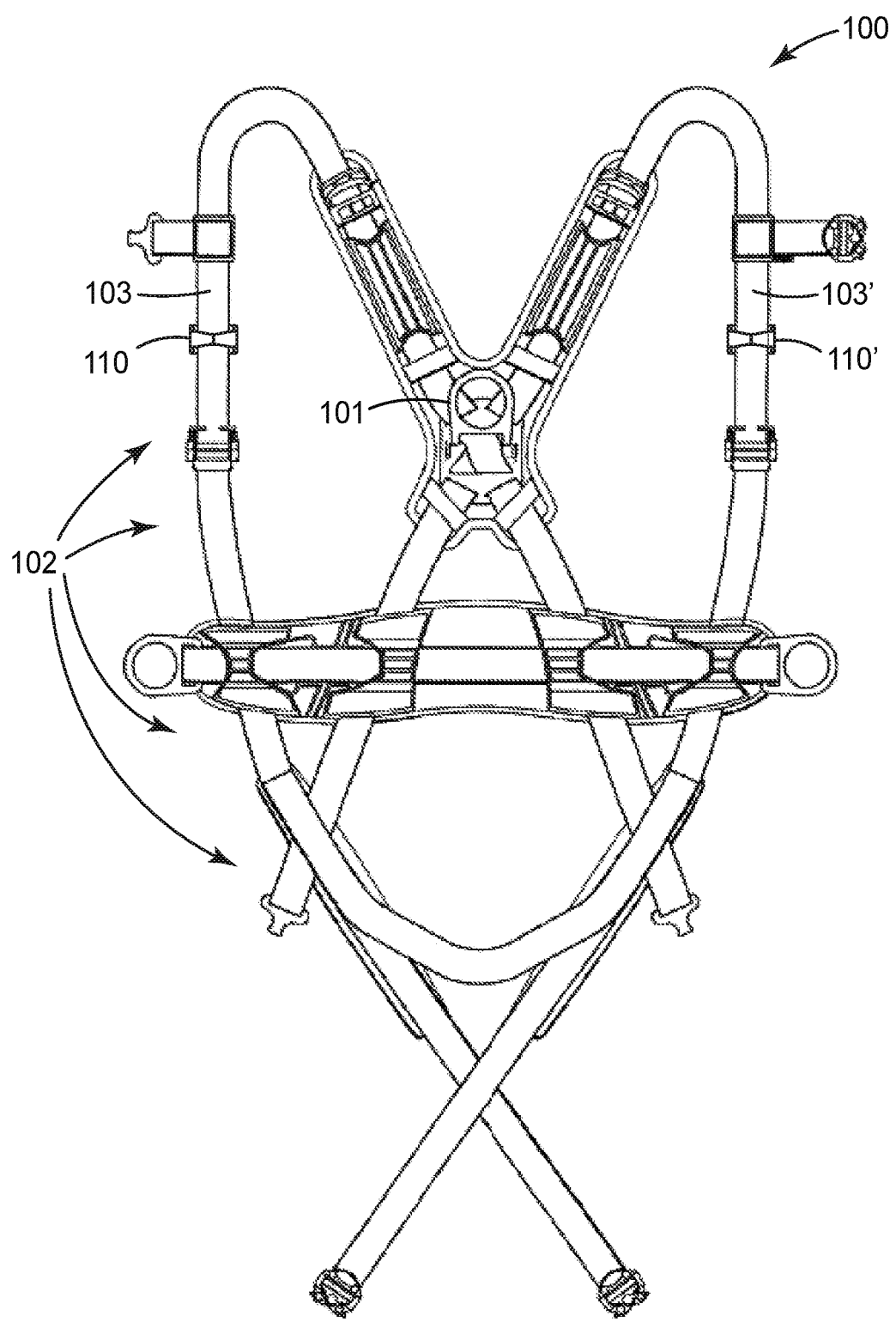
FIG. 4 is a rear view of another exemplary fall-protection harness.
Figure 6:
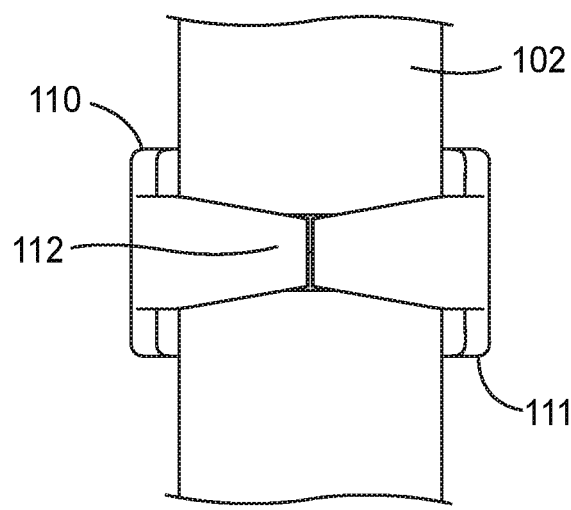
FIG. 6 is a front view of an exemplary lanyard keeper of a fall-protection harness.
Figure 7:
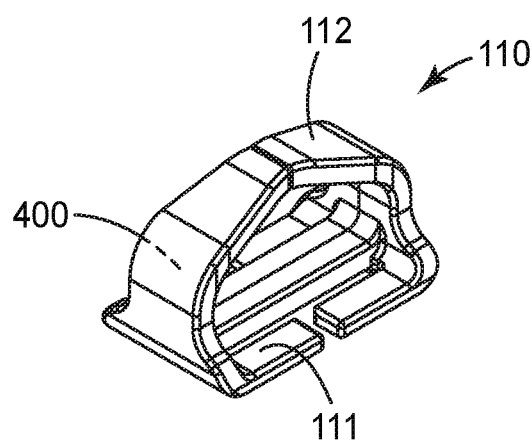
FIG. 7 is a perspective view of an exemplary lanyard keeper of a fall-protection harness.
Figure 8:
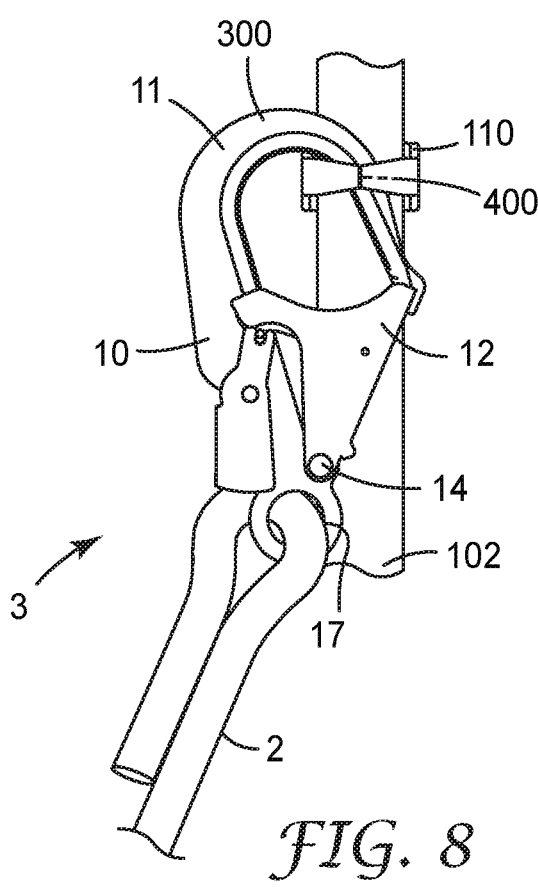
FIG. 8 is a front view of an exemplary connector of a fall-protection apparatus, parked on an exemplary lanyard keeper of a fall-protection harness.

The presently-disclosed arrangements can provide numerous advantages in various exemplary embodiments. For example, in many uses of a fall-protection apparatus such as a lanyard of the general type depicted in FIG. 1, a connector-bearing end 3 of a safety line 2 of the lanyard is to be connected (often referred to as tied off) to a worksite anchorage. During intervals in which the safety line is not tied off, it may be disadvantageous or inconvenient for the connector-bearing end 3 of the safety line 2 to be e.g. dangling loose. So, fall-protection harnesses 100 are often equipped with one or more devices 110 (as shown in FIG. 4, and as shown in closer detail in FIGS. 6 and 7) typically referred to as lanyard keepers. (Certain lanyard keepers are described e.g. in U.S. patent Ser. No. 10/258,814, which is incorporated by reference herein in its entirety.) In many convenient embodiments, a lanyard keeper may be located on a chest strap 103 of a harness, as in the exemplary arrangement of FIG. 4. Such a lanyard keeper may e.g. comprise a base 111 that allows the keeper to be mounted on a strap (e.g. as shown in FIG. 6) and from which protrudes one or more members 112 that allow a connector 10 to be "parked" on the lanyard keeper in the general manner depicted in FIG. 8.

An inductive sensing unit 300 as disclosed herein can detect that a connector 10 appears to be connected to a first item that is e.g. a worksite anchorage. Sensing unit 300 can thus report a first indication that the connector appears to be tied-off to a worksite anchorage. Sensing unit 300 can alternatively detect that connector 10 appears to be connected to a second item, such as a lanyard keeper 110 of a fall-protection harness. (The lanyard keeper and/or the worksite anchorage may be appropriately configured to be detectable, and to be distinguished from each other, by the sensing unit, as discussed later herein.) Sensing unit 300 can thus report a second indication that the connector appears to be parked on a lanyard keeper of a harness. Sensing unit 300 can still further detect that connector 10 does not appear to be connected to either a first item or a second item. Sensing unit 300 can thus report a third indication that the connector may be e.g. dangling freely.

The arrangements disclosed herein thus allow more than the mere reporting of binary conditions (e.g. whether a connector is tied off or is not tied off). By way of a simple example, a sensing unit may report e.g. a visual indication such as a green light when the connector appears to be tied off to an anchorage, a yellow light when the connector appears to be parked on a harness, and a red light when the connector may be dangling freely.

Similar arrangements may be made e.g. if the fall-protection apparatus is a personal self-retracting lifeline (SRL). It may seem that there may be no need to, for example, detect that a connector at the end of a safety line of an SRL is parked on a fall-protection harness. That is, an SRL is typically configured to automatically retract any slack in the safety line; therefore, a connector that is not tied off to an anchorage should eventually end up snugged up near the SRL housing and thus might not need to be "parked" on a keeper. However, even in a maximally-snugged configuration a connector may still dangle some distance away from the housing; therefore, it can be advantageous for a connector of a personal SRL to be parked on a lanyard keeper of a harness when not connected to an anchorage.

In instances in which the fall-protection apparatus is a twin-leg apparatus (e.g. a twin-leg lanyard of the general type shown in FIG. 1, or a twin-leg SRL of the general type shown in FIG. 2), similar considerations apply. Twin-legged fall-protection apparatus are often used in instances in which it is desirable to maintain so-called 100% tie-off. That is, it may be desired that at least one safety line of the fall-protection apparatus is to be connected to a worksite anchorage at all times. Thus, two such safety lines can be provided, with one line remaining connected to an anchorage while the other line is moved to a new anchorage, and vice versa. Such twin-legged fall-protection apparatus may be particular useful e.g. when a user is climbing or descending a scaffold, a tower, or the like, in which the two safety lines are successively moved upward or downward to new anchorages.

To allow for such functioning, in some embodiments the sensing units of first and second connectors 10 and 10' on first and second safety lines 2 and 2' may be in operative communication. This encompasses situations in which the two sensing units communicate with each other directly, in which they communicate with each other through an intermediary, or in which they both communicate e.g. to a common destination or hub (e.g. a cell phone). This can allow that the user can be kept appraised of the status of both of the connectors. It will be appreciated that many combinations of statuses are possible and can be reported (e.g., both connectors are tied off, both are parked, both are neither tied off nor parked, one is tied off and one is parked, and so on).

In view of the above discussions it can be appreciated that the arrangements disclosed herein may be used in a fall-protection apparatus, system and/or method intended for use in any desired fall-protection application, e.g. fall arrest, restraint, positioning, suspension, rescue, and so on.

A connector of a fall-protection apparatus as disclosed herein is often connected to a worksite anchorage. As used herein, the term worksite anchorage denotes any worksite item or assembly of items to which it is appropriate to connect a safety line of a fall-protection apparatus. These fall into two broad categories. The first category encompasses items that are conventionally present at a worksite and that comprise appropriate geometry and physical strength to serve as an anchorage for a safety line of a fall-protection apparatus, and that have at least one function beyond serving as a potential anchorage for a safety line. Such items will be referred to herein as generic structural items. Such items are often structural members or combinations of structural members; non-limiting examples of such items include e.g. rebar, tubing (of scaffolding; girders, struts, posts, columns or beams (e.g. of a tower, bridge or the like); safety rails, and so on. Often such items may be made of metal (e.g. steel or aluminum). The use of an appropriately configured second item (e.g. a lanyard keeper of a harness) can thus allow the second item to be distinguished from a first item that is a generic structural item that serves as a worksite anchorage.

A second category of worksite anchorage is a dedicated item that is installed at a worksite specifically to serve as an anchorage for use with a fall-protection apparatus. Such an item will be termed a dedicated anchorage; such an item typically has no function other than to be used with, or as part of, a fall-protection apparatus or system. The use of an appropriately configured first item that is a dedicated worksite anchorage and an appropriately configured second item that is e.g. a lanyard keeper of a harness can allow an inductive sensing unit to distinguish the dedicated worksite anchorage from the lanyard keeper. Moreover, in at least some embodiments the use of an appropriately configured first item that is a dedicated worksite anchorage can allow the dedicated worksite anchorage to be distinguished from a worksite anchorage that is a generic structural item (e.g. tubing of scaffolding, and so on) present at the work site. Still further, the use of an appropriately configured first item that is a dedicated worksite anchorage and an appropriately configured second item that is a dedicated worksite anchorage of a different type or at a different location can allow the first and second dedicated worksite anchorages to be distinguished from one another.

In various embodiments, a dedicated worksite anchorage may be a permanently installed item (and may e.g. be fixed in a particular place rather than being portable) or may be a temporarily installed item. For example, the arrangements disclosed herein may be used in e.g. new construction or in maintenance or repair of existing structures. In some structures (e.g. existing towers) dedicated worksite anchorages may have been incorporated in the structure when it was originally constructed. In other instances (e.g. in new construction) dedicated worksite anchorages may only be installed for use during the actual period of construction.

Figure 9:
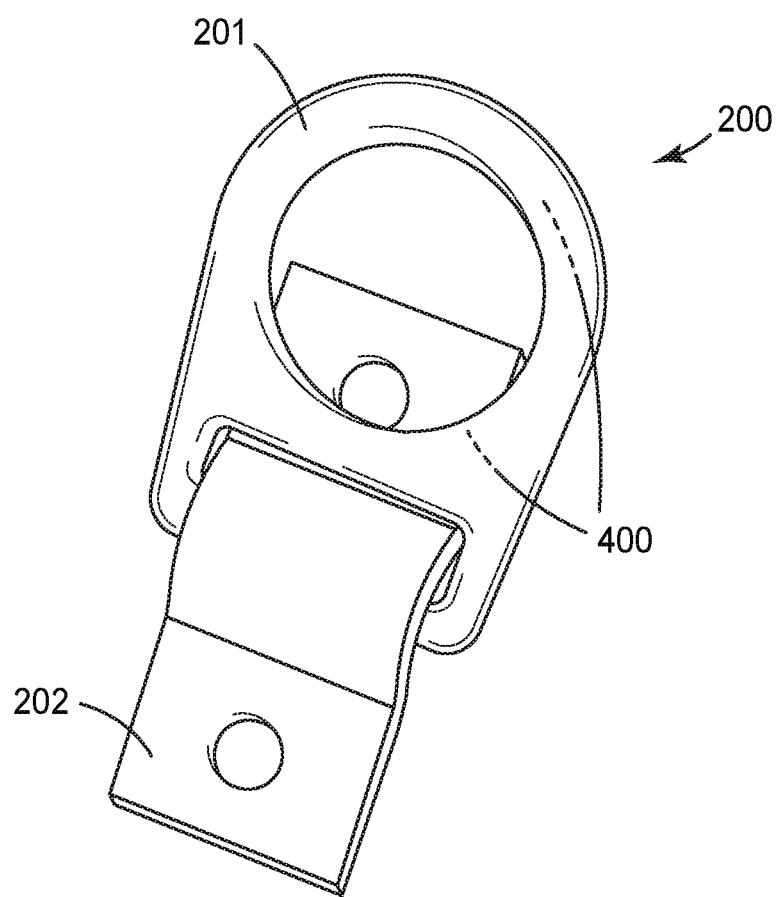
FIG. 9 is a perspective view of an exemplary anchorage of a worksite.

One simple example of an item that can be used to form a worksite anchorage is presented in FIG. 9. This item (usually referred to as a D-ring anchorage plate) comprises a D-ring 201 that is seated in a base 202 that can be secured (e.g. bolted or welded) to an appropriate structural entity of a worksite to provide an anchorage 200. It will be appreciated that numerous such items, of designs of varying complexity and for use in various circumstances and locations, are available. Such items include products variously termed steel plate anchors, drop-through anchors, fixed beam anchors, sliding beam anchors, concrete wedge anchors, toggle anchors, concrete D-ring anchors, concrete detent anchors, roof top anchors, and so on.

In some embodiments a temporarily installed dedicated worksite anchorage may be a portable anchorage, e.g. provided by a so-called anchor strap. Such items may be installed in any appropriate location to form an anchorage, can be moved as needed, and can be removed when no longer needed. Examples of portable anchorages include e.g. products variously termed anchor straps, web tie-off adaptors, cable tie-off adaptors, web scaffold chokers, and so on.

Figure 10:
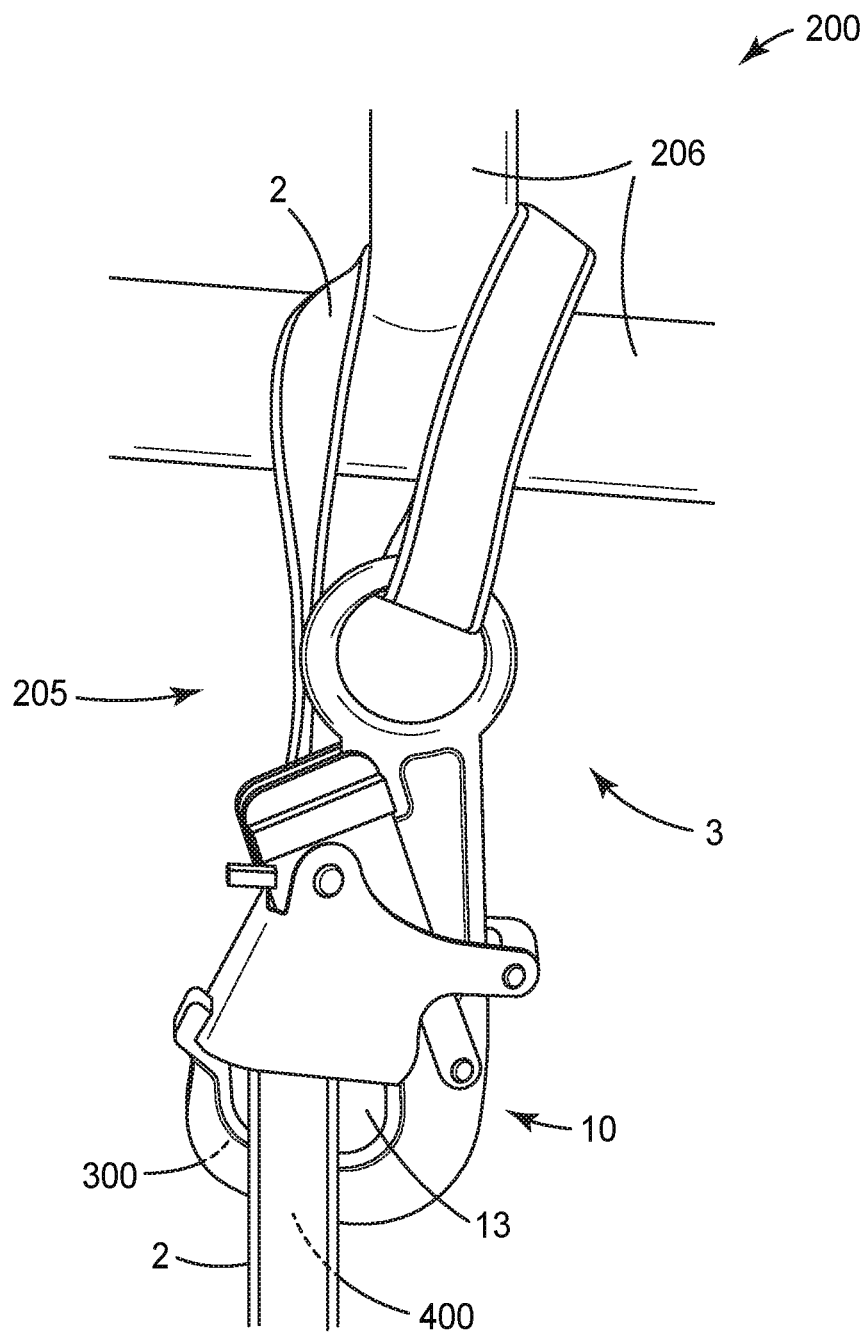
FIG. 10 is a perspective view of another exemplary anchorage of a worksite.

A special case of a temporarily installed dedicated worksite anchorage is a so-called tied-back arrangement (sometimes referred to as a back-wrapped arrangement) 205 of a safety line 2 of a fall-protection apparatus (such as e.g. a lanyard), as illustrated in exemplary embodiment in FIG. 10. In such a case, a portion of a safety line 2 that is proximate a distal end 3 of the safety line is used to form an anchorage by passing the connector-bearing end 3 of the line around an appropriate structural item 206 of the worksite (e.g. a member such as a beam, strut, girder or the like) and then connecting the connector 10 to the safety line 2 itself. A portion of the safety line 2 thus resides within the opening 13 of the connector 10, as evident in FIG. 10. It will be appreciated that in such an arrangement a connector 10 will be attached (e.g. non-removably attached) to a distal end 3 of a safety line 2 and will also be connected (removably hooked onto) to a portion of the safety line that is proximal to the distal end of the line, also as evident from FIG. 10.

In view of the above discussions of the many different types of worksite anchorages that may be present in a worksite, it will be appreciated that in some instances the present arrangements may be used to distinguish between a first item that is a particular type (or location) of worksite anchorage and a second item that is a different type (or differently-located) worksite anchorage. In other words, the arrangements herein can allow distinguishing between different worksite anchorages rather than only, for example, distinguishing between a worksite anchorage and a lanyard keeper.

There are various ways in which a first item and a second item may be configured so that a resonant-frequency-shifting inductive sensing unit can detect each item and can distinguish the items from each other. In some embodiments, a desired item (e.g. a first worksite anchorage), or at least portions of the item that may end up residing within an opening 13 of a connector 10, may be made of a first metal. For example, a first item (e.g. a D-ring of an anchor strap that is used to form a first worksite anchorage) may be made of steel. And, a second item (e.g. a D-ring of a fall-protection harness, or a D-ring of a second worksite anchorage such as e.g. a concrete anchor) may be made of aluminum. In such a case the second D-ring may exhibit a different resonant frequency from the first D-ring and may thus be distinguishable from the first D-ring. In such approaches a particular metal may play a role in achieving the desired mechanical strength of the item and may also serve as an inductively-identifiable material. Such approaches may take advantage of the availability of various anchorage components in different choices of metals (e.g. steel or aluminum). However, it will be appreciated that the available choices may be limited.

In some embodiments, the arrangements disclosed herein may be achieved or enhanced by equipping one or more designated items with a material that is deliberately provided with (e.g. added to) the item and that is purposefully configured to alter the inductive signature of the item in a desired manner. For example, a designated item may be configured to include a resonant-frequency-altering material that causes the resonant-frequency-shifting inductive sensing unit to observe a resonant frequency that is lower, or higher, than a resonant frequency that would be observed in the absence of the resonant-frequency-altering material.

By way of a particular example, a lanyard keeper 110 of the general type often provided with a fall-protection harness 100 (and discussed earlier herein) is often made of molded plastic. Such an item may be purposefully equipped with a resonant-frequency-altering material 400 (generally indicated in FIG. 7) that alters the inductive signature of the lanyard keeper. In particular embodiments, such a material 400 may be a ferrite material. In some cases, such a material may serve only for purposes of inductive identification and will not necessarily contribute significantly (or at all) to the mechanical strength of the item. A suitable material 400 may be e.g. provided within a cavity within a desired portion of lanyard keeper 110, may be provided as a wrap, shroud or sheath that envelops a desired portion of the lanyard keeper, may be provided in a molded plastic item that fits onto the lanyard keeper, and so on. In some embodiments, a suitable material may be compounded into the molding resin that is used to form the lanyard keeper.

Arrangements of this general type may allow a sensing unit 300 to distinguish whether a connector 10 appears to be parked on a lanyard keeper or appears to be connected to a conventional worksite anchorage (that is e.g. made of steel), in the general manner described earlier herein. Regardless of the particular arrangement, any such material 400 will be configured so as to not interfere with the functioning of lanyard keeper 110. For instance, many lanyard keepers are configured with breakaway capability (e.g. in the event that the safety line snags on some object); in such instances material 400 may be configured so as to not interfere with this functionality.

In generally similar manner as described above for lanyard keepers, in some embodiments a chosen anchorage of a worksite may be purposefully equipped with a frequency-altering material 400 that alters the inductive signature of the anchorage. This may provide that a sensing unit can report whether a connector (whether of e.g. a lanyard or a personal SRL) appears to be connected to an anchorage that is a first type (or is in a particular location) or to an anchorage that is a second type (or is in a different location). In such a case, the first (or the second) anchorage may be equipped with a material 400 (e.g. a ferrite material) which can allow the particular anchorage to be identified.

By way of another particular example, an anchorage comprising an anchorage element (e.g. a D-ring) of a particular configuration (e.g. size, shape, strength rating, etc.) may be equipped with a material 400, as indicated in generic representation in FIG. 9, that enables the anchorage to be identified and distinguished from other anchorages. Such a material 400 may be provided in any suitable physical form, e.g. fitted into a molded item that is mounted on the D-ring, incorporated in a shroud, wrap or sheath that is wrapped around a portion of the D-ring, and so on.

By way of another particular example, at least a portion of a safety line 2 that is proximate the distal end 3 of the safety line may be equipped with a material 400, as indicated in generic representation in FIG. 10, that enables the thus-formed (tied-back) anchorage 200 to be identified and distinguished e.g. from other anchorages. In one exemplary way of achieving such an arrangement, a safety line that is in the form of flat webbing (as in FIG. 10) may comprise at least a portion that comprises a layer of material 400 (e.g. a layer of ferrite material such as the product available from 3M, St. Paul, MN, under the trade designation 3M FLUX FIELD DIRECTIONAL MATERIAL) that is sandwiched between two layers of the webbing material. The layers of webbing material may extend beyond the lateral edges of the layer of material 400 and may be e.g. sewn together to form a sandwich structure with material 400 securely held therein. Such an arrangement may provide the desired ability to detect this portion of the safety line, while still meeting all appropriate requirements (e.g. strength and flexibility) of the safety line itself. It will be appreciated that in many embodiments only a portion of the safety line that is proximate the distal end of the line need be configured in this manner; that is, it may not be necessary that the entire length of the safety line be configured with material 400, although this can be done if desired. Any such arrangement can allow a so-called tied-back temporary anchorage to be detected, to be distinguished e.g. from other anchorages, and so on.

Thus in summary, in some embodiments a purposefully-added frequency-altering material 400 can be provided with or on any desired item, in order to alter the inductive signature of the item. The amount, location, size, shape, aspect ratio, and so on, of the material 400 can be chosen as desired in order to achieve the desired effect.

A resonant-frequency-shifting inductive sensing unit as disclosed herein can be configured to enable the sensing unit to detect, and distinguish between, at least first and second items as disclosed herein. This may be done by purposeful manipulation or arranging of any suitable operating parameter(s) of the sensing unit, whether e.g. by software, firmware, hardware, the number and/or location of individual inductive sensors in the sensing unit, and so on. For example, the sensing unit may be configured to detect various different frequencies (noting in particular that an added material such as a ferrite may shift the resonant frequency of an LC circuit of an inductive sensor downward, whereas the presence of a metal such as steel or aluminum will typically shift the frequency upward). In some embodiments, a sensing unit may comprise multiple inductive sensors, e.g. that operate in different frequency ranges. In some embodiments, a sensing unit may comprise multiple inductive sensors, positioned so that a relatively large item (e.g. a nominal 2" diameter tubing of a scaffold), when positioned in opening 13 of connector 10, will be detected by both sensors, whereas a smaller item (e.g. a safety line 2 such as that shown in FIG. 10) may only be detected by one sensor, in order that such items may be distinguished. The discussions herein, along with the detailed discussions in the previously-mentioned U.S. Provisional Patent Application No. 62/628,720, and in PCT application No. US2019/016768, both of which are incorporated by reference in their entirety herein, will enable ordinary artisans to appreciate various ways in which a resonant-frequency-shifting inductive sensing unit and/or items that are to be detected and distinguished by the sensing unit, can be configured to achieve the desired effects.

A fall-protection apparatus 1 as disclosed herein comprises at least one sensing unit 300 that is configured to report an indication of a status of a connector (or connectors) 10 of the fall-protection apparatus. The reports issued by the sensing unit(s) can enhance the convenience and/or efficiency with which a fall-protection apparatus may be used. The terms report and indication are used broadly to denote any method or mechanism by which a user (or other person or monitoring entity) may be apprised of the status of a connector. Such a report may be presented in any suitable way. In some embodiments, a report may take the form of a visible notification, e.g. the illumination of a light where none was illuminated before, the changing in color of a light, the changing of a light from steady to flashing (or vice versa), and so on. In some embodiments, a visible notification may comprise information (e.g. information text). In some embodiments, a visible notification may be presented on a portion of the connector itself (e.g. a light on the connector may be illuminated). Or, in some embodiments, the sensing unit may send a signal to a separate notification device; for example, the sensing unit may send a signal to a mobile device such as a cell phone, which then displays a visible notification. Thus, a sensing unit may utilize a notification unit that is physically separated from a main body of the sensing unit and with which the other components of the sensing unit may communicate wirelessly, e.g. by Bluetooth or any other suitable method.

In some embodiments, a report may take the form of an audible notification. Such a notification may take the form of emission of a sound, of ceasing to emit a sound, of changing the character of a sound (e.g. loudness, pitch, or frequency of intermittent sounds), and so on. In similar manner to a visible notification device, an audible notification device may be co-located with the main portion of a sensing unit or may be physically separated from the main body of sensing unit. It is not strictly necessary that an audible signal be broadcast from the same location as a visible signal; so, if desired, two notification devices may be provided that are physically remote from each other, e.g. one audible and one visible.

Other possible notifications include e.g. mechanical or tactile notifications (e.g. vibration, buzzing or the like). Any combination of such notifications (e.g. a flashing light along with a beeping sound) may be used as desired. In many embodiments a notification may be primarily intended for a user of the fall-protection apparatus. However, in some embodiments a notification (for example, if broadcast in the form of a visible signal such as a flashing light, or an audible signal such as a beeping tone) may be evident to other nearby persons in addition to the user.

The discussions above make it clear that in various embodiments a report (e.g. a signal, broadcast, transmission, etc., of any type) can take the form of a positive indication or a negative indication. In this context, the terms positive and negative are used to characterize the way in which an indication is delivered; the term positive does not necessarily denote that an item was detected and the term negative does not necessarily denote that an item was not detected. Rather, by a positive indication is meant the generation of a signal (e.g. a visual and/or audible signal) where none was present beforehand. By a negative indication is meant the cessation of a previously-existing signal. By way of a simple example, a sensing unit of a connector may be configured to emit a positive signal (e.g. a flashing light and/or a beeping sound) if no item is detected (e.g. if the connector has been disconnected from a worksite anchorage). Upon the connector being connected to a detectable item, e.g. a lanyard keeper or a worksite anchorage, the sensing unit may then issue a negative indication, in the form of a cessation of the flashing light and/or the beeping sound. Of course, in some instances, a notification may take the form of a signal that continues, but changes in character, e.g. the color of a light, the level or pitch of an audible signal, and so on. Likewise, in some instances, a notification may involve the cessation of one signal to be replaced by a different signal.

In summary, a sensing unit may be configured to report a first indication if a first item is detected and to report a second indication is a second item is detected. In this context, the terms first and second do not indicate a specific (e.g. predetermined) difference in temporal order but rather merely denote that the second indication is different from the first indication.

Any additional sensor(s) that is configured to perform some function other than sensing a portion of an item in an opening of a connector may be utilized by sensing unit 300 in order to enhance the above-disclosed functioning. Any such additional sensor may be provided in any particular location and/or applied to any particular step or operation in the use of connector 10 and of a fall-protection apparatus and/or system in general. For example, in some embodiments a connector that is gated (e.g. a gated hook of any type or design) may be equipped with a gate sensor 18 (indicated generally in FIG. 5) that can monitor a state of a movable gate 12, e.g. whether the gate appears to be open or closed. A gate sensor 18 may be any suitable sensor or combination of sensors, operating by any suitable sensing mechanism, whether e.g. mechanical, optical, electrical, magnetic, inductive, and so on. The term gate sensor is used to broadly encompass any sensor that can monitor a state of a movable gate 12 of a connector, whether this is achieved by directly monitoring gate 12, or by monitoring some other component that allows the state of gate 12 to be inferred. For example, in some embodiments a gated hook may be a locking hook that comprises a gate lock that must be unlocked (released) in order for gate 12 to be moved from a closed position to an open position. In some such embodiments a gate sensor may be configured to monitor the condition of the gate lock (e.g., whether it is locked or unlocked) in order to infer the state of the gate. In some embodiments, a gate sensor may be configured to monitor the condition of an actuator (e.g. a squeezable handle) that is used to open a gate, to release a gate lock to enable a gate to be opened, and so on.

Thus in various embodiments, a gate sensor may configured to monitor (directly or indirectly) any or all of various conditions, including e.g. gate open, gate closed, gate lock locked, gate lock released, actuator actuated, actuator not actuated, and so on, in order to provide an indication of the gate status, e.g. whether the gate appears to be open or closed.

In some embodiments, such a gate sensor 18 may operate, and report an indication of whether the gate is open or closed, independently of the above-described inductive sensing unit 300. However, in some particularly advantageous embodiments, a gate sensor 18 may communicate with (and thus operatively serve as a component of) a sensing unit 300, whether such communication is direct, or is through an intermediary, or involves an arrangement in which an inductive sensor and a gate sensor send information to a common processing unit that receives information from both sensors. Such arrangements can allow an enhanced mode of operation of a connector 10 and of a fall-protection apparatus 1 in general. For example, in such a mode, an inductive sensing unit 300 may need only provide an initial indication of the presence of an item (e.g. a first item or a second item) within opening 13 of connector 10. That is, the inductive sensing unit 300 can detect that a portion of the item is present in opening 13 of connector 10 (and can thus infer that the connector appears to be connected to the item) and may report an indication thereof. Concurrently or subsequently to this, gate sensor 18 can detect that gate 12 has closed. As long as gate sensor 18 continues to detect that gate 12 has remained closed, inductive sensing unit 300 can continue to report the indication that the connector appears to be connected to the item, even if, for example, inductive sensing unit 300 momentarily ceases to detect the item.

The use of a gate sensor as an adjunct to the functioning of an inductive sensing unit may be limited to specific circumstances in which use of a gate sensor is appropriate. Such a mode of operation may be particularly advantageous in some instances, e.g. in which the detected item is a portion of a safety line 2 that is wrapped around a structural item 206 to form a tied-back anchorage of the general type depicted in FIG. 10. In some instances, such a safety line may occupy a relatively small portion of the area of opening 13 of connector 10 and thus may move around within opening 13 to a certain extent, e.g. so that a sensing unit 300 of connector 10 may detect the safety line only intermittently. Even if the detection of the presence of safety line 2 within opening 13 is intermittent, the gate sensor may provide a continuing indication that the gate has remained closed. In such an instance, the sensing unit may continue to provide an indication that connector 10 appears to be connected to the (tied-back) anchorage.

It is thus evident that in some circumstances, an inductive sensing unit can work in concert with (e.g. can comprise) a gate sensor so that, for example, the inductive sensing unit need only provide an initial indication that an item is present within the opening that is monitored by the sensing unit. Thus in some embodiments, a resonant-frequency-shifting inductive sensing unit may comprise a gate-sensor-override function that is configured so that even if the inductive sensing unit ceases to detect that the connector appears to be connected to an item, the inductive sensing unit will continue to report an indication that the connector appears to be connected to the item as long as the gate sensor shows that the gate appears to have remained closed since a previous detection that the connector appeared to be connected to the item. The specific operating parameters of any such gate-sensor-override function may be chosen as appropriate.

It will be appreciated that many variations of the herein-described reporting arrangements are possible. For example, in the event that a connector appears to be neither parked on a lanyard keeper of a harness nor attached to a worksite anchorage, the sensing unit may provide a very noticeable visual notification (e.g. a red and/or flashing visible signal), along with a loud or otherwise obtrusive audible notification. If the connector appears to be parked on a harness, the sensing unit may provide a more neutral visible notification and/or a more neutral (e.g. less obtrusive) audible notification. If the connector appears to be attached to a worksite anchorage, the sensing unit may provide an affirmative signal or may cease to provide any visible and/or audible signal. It will be appreciated that the above scenarios are merely exemplary illustrations and that a wide variety of arrangements, choice of signals (e.g. color, wording of any text, character and loudness of any audible signals, and so on), etc. are possible.

For fall-protection apparatus that comprise two connectors and sensing units (e.g. twin-leg apparatus) still more scenarios are possible. For example, it may be reported that both connectors appear to be parked, that both appear to be connected to an anchorage, or that both appear to be not connected to anything. Or, it may be reported that one of the two connectors is in such a state, and so on. Various signals, combinations of signals, and so forth, may be used to provide such indications. In particular embodiments that involve two connectors and sensing units, certain indications that would ordinarily be provided concerning the status of one connector may be suppressed or momentarily suspended (e.g. a grace period applied as described below) in view of the detected status of the other connector. For example, an indication that one connector appears to not be connected to anything may be suspended or delayed as long the other connector continues to be detected as appearing to be connected to an anchorage. In one specific example, if a first connector is disconnected from an anchorage while a second connector remains connected to an anchorage, the sensing unit of the first connector may emit an indication in the form of a flashing light but may refrain from emitting an indication in the form of an obtrusive sound.

In some embodiments a sensing unit (or sensing units of two connectors) may be configured to observe a grace period before reporting certain indications. Thus, for example, if a connector is disconnected from a worksite anchorage or from a lanyard keeper of a harness, the sensing unit may wait a specified period of time (e.g. 5, 10, or 30 seconds) before reporting an indication. If both a visible indication and an audible indication are issued, different grace periods may be used for each. And, of course, as discussed above, the presence of a gate sensor can allow the functioning of the sensing unit(s) to be configured in still more ways.

In view of these discussions, it is evident that a requirement that a sensing unit is configured to report an indication upon detecting an item (or upon ceasing to detect an item) does not necessarily imply that the sensing unit must report the indication immediately thereafter. Rather, any such reporting may not occur until e.g. the elapsing of a grace period, and/or may be superseded, overridden, or canceled e.g. in light of information received from a gate sensor. However, the sensing unit must nevertheless be capable of reporting such an indication in at least some circumstances.

Discussions heretofore herein have primarily concerned the use of a connector 10 that is located at the distal end 3 of a safety line 2 and that can be, for example, connected to an anchorage of a worksite or "parked" on a lanyard keeper. The fall-protection apparatus shown in FIGS. 1 and 2 are examples of such arrangements. However, the arrangements disclosed herein may find use in other circumstances. For example, FIG. 11 shows a self-retracting lifeline (SRL) that is not a "personal" SRL of the type described earlier herein (in which the housing of the SRL is typically secured to, and stays with, a harness worn by the user). Rather, the SRL of FIG. 11 is of a different type which will be herein termed a "standard" SRL to distinguish it from a personal SRL. In a standard SRL, the SRL housing is typically secured to a worksite anchorage rather than to the user's harness. The housing remains in the same location (rather than moving with the user as with a personal SRL) with the safety line paying out from the housing and withdrawing into the housing as the user moves away from, and toward, the housing.

In some embodiments, a safety line 2 of a standard SRL may comprise a connector (e.g. a hook) 212 that is equipped with a frequency-shifting inductive sensing unit 300. In such an arrangement, the sensing unit may be able to, for example, detect and report whether the connector 212 appears to be connected to a D-ring of a harness worn by a user, or to some other item. In particular embodiments, the sensing unit may be able to detect and report whether the connector appears to be connected to a dedicated docking station. For example, in some embodiments a worksite may comprise a dedicated docking station that serves a somewhat similar purpose to the previously-described lanyard keeper—that is, the docking station is configured to accept the connector when the connector is not connected to the harness of a user. In such cases, the sensing unit may be configured to report whether the connector appears to be connected to the harness or appears to be docked on a docking station. Such uses are described in detail in U.S. Provisional Patent Application No. 62/822,457, which is incorporated by reference in its entirety herein. In such cases, either or both of a D-ring of a harness, or a docking station, may be equipped with e.g. a ferrite material to alter an inductive signature of the item, as desired.

A standard SRL may comprise a coupler 213 that is used to couple a housing 6 of the SRL to an anchorage 200 that is present on (e.g. attached to or part of) a structural component 211 (e.g. a beam or girder) at a worksite, as shown in exemplary embodiment in FIG. 11. In some embodiments, such a coupler 213 may be equipped with a frequency-shifting inductive sensing unit 300 that is configured e.g. to detect a particular type of worksite anchorage (e.g. an anchorage that has been equipped with a ferrite material). In other words, such a coupler 213 may serve as an inductive-sensing-unit-equipped connector of a fall-protection apparatus. Such an arrangement may allow the sensing unit to, for example, confirm that an SRL appears to have been coupled to an anchorage that is of a type (and/or that is at a worksite location) that is appropriate for that type of SRL, an anchorage that has been inspected and/or certified, and so on.

It will thus be appreciated that a connector that is equipped with an inductive sensing unit need not necessarily be attached to a safety line of a fall-protection apparatus. That is, in some embodiments a sensing-unit-equipped connector may be e.g. a hook that is connected (e.g. directly connected) to an end of a safety line, while in other embodiments a sensing-unit-equipped connector may be a coupler that serves to couple a housing of an SRL to a worksite anchorage. In some embodiments more than one connector of a fall-protection apparatus may be equipped with an inductive sensing unit, for various purposes chosen e.g. from those discussed herein.

The discussions herein make it clear that the arrangements disclosed herein may be used with a wide variety of fall-protection apparatus, methods and systems, and can be implemented in a variety of ways. Fall-protection apparatus and systems (e.g. lanyards, self-retracting lifelines, horizontal systems, vertical systems, and so on), fall-protection harnesses, fall-protection anchorages, components of such apparatus, systems, equipment, and so on, with which the arrangements disclosed herein may find use, are described e.g. in the 3M DBI-SALA Fall Protection Full Line Catalog 2018.

The arrangements disclosed herein may be used in any worksite at which fall-protection is used. The concept of a worksite encompasses any structure, facility, indoor area, outdoor area, and so on, at or in which any of a variety of activities (whether one-time or ongoing) may occur. Such activities may include e.g. new construction, repair, maintenance, refurbishing, inspection, deposition and/or retrieval of items, and so on. Such activities do not necessarily need to involve construction; rather, a worksite may take the form of any location (such as a warehouse) in which equipment is used (e.g. an aerial lift, an order picker or the like) that causes fall protection to be appropriate. The term worksite of course encompasses environments such as towers, bridges, mine shafts, and so on.

In the arrangements and scenarios discussed herein, an item to be detected is an item (such as e.g. an anchorage or a lanyard keeper) that includes at least some solid material (in other words, "detecting" empty space or air does not count). The terms first and second items denote items to which, in ordinary use of a fall-protection apparatus, a connector of the apparatus can be alternatively connected, rather than items to which the connector is to be connected simultaneously. (In most instances, items such as e.g. anchorages of worksites and lanyard keepers of harnesses will be physically apart from each other such that it would not normally be possible to connect a connector to both items simultaneously.)

By definition, the detecting of whether a connector appears to be connected to a "first" or "second" item means detecting whether the connector appears to be connected to that specific item (e.g. determining whether the connector appears to be connected to a first item rather than determining that the connector may be connected to any of a first item, a second item, and so on). Moreover, the detecting of an item is an active detection that is not achieved merely by detecting the absence of some other item. For example, the detecting of a second item is not achieved merely by not detecting a first item.

The arrangements disclosed herein may allow various fall-protection apparatus, systems and/or methods to be enhanced (e.g. to be used in a more convenient and/or efficient manner). The discussions herein do not imply that any existing apparatus, systems and/or methods are deficient. The arrangements disclosed herein may report indications of certain aspects of the status of a fall-protection apparatus (e.g. the status of a connector of a safety line of the apparatus). The presence of any arrangement as disclosed herein will not relieve a user of a fall-protection apparatus or system of the duty to follow all appropriate laws, rules, codes, standards as promulgated by applicable bodies (e.g. ANSI), instructions as provided by the manufacturer of the apparatus or system, instructions as provided by the entity in charge of a worksite in which the apparatus or system is used, and so on.

In certain embodiments, e.g. in which two connectors are present, each equipped with a sensing unit 300, the sensing units may be configured to communicate. Moreover, even if only one sensing unit is present, it may be desirable that the sensing unit is able to communicate with a notification device so that an indication can be reported by the notification device. In such an instance, the notification device, even if physically remote from the sensing unit, can be considered to operatively be a component of the sensing unit. In some embodiments a sensing unit may be configured to communicate with a mobile device, a central hub or monitoring station, and so on. Any such communication may conveniently be wireless, whether by e.g. wi-fi, a wireless local area network, Bluetooth, Zigbee, or any suitable method or protocol. In various embodiments, the communication may be two-way or one-way, as desired. In various embodiments, any status that is detected and/or reported by the herein-disclosed arrangements may be logged, reported to a central hub or monitoring station for tracking purposes, and so on.

From the above discussions it is clear that not all of the components and items of a sensing unit (e.g., the various entities used to operate the inductive sensor(s) of the sensing unit and/or to report an indication based on information obtained from the sensing unit) need to be physically resident on or in the same physical entity that bears the inductive sensor(s). That is, a sensing unit as disclosed herein may include items that are e.g. in wireless communication with the inductive sensor(s) and/or with other components of the sensing unit.

Discussions heretofore herein have primarily concerned equipping a connector (e.g. of a fall-protection apparatus such as e.g. an SRL or lanyard) with a resonant-frequency-shifting inductive sensing unit configured to detect whether the connector appears to be connected to a first item, or to a second (or other) item. For example, such a sensing unit may be configured to detect whether a connector appears to be parked on a lanyard keeper or connected to an anchorage. However, the disclosures herein also encompass embodiments in which a lanyard keeper is equipped with a resonant-frequency-shifting inductive sensing unit, e.g. so that the lanyard keeper can distinguish between multiple types of connectors that may be able to be parked on the lanyard keeper. For example, such a lanyard keeper may be able to distinguish that a hook that is parked on the lanyard keeper is a first type of hook rather than a second, different type of hook. The disclosures herein also encompass embodiments in which an anchorage (e.g. a dedicated anchorage) of a worksite is equipped with a resonant-frequency-shifting inductive sensing unit, e.g. so that the anchorage can distinguish between multiple types of connectors that may be able to be connected to the anchorage. For example, such an anchorage may be able to distinguish that a hook that is connected to the anchorage is a first type of hook rather than a second, different type of hook. Based on the discussions herein, ordinary artisans can readily appreciate the uses of such arrangements. While not repeated at this specific location of this document for brevity, all of the discussions herein of features, components and arrangements of inductive sensing units, the functioning of inductive sensing units, methods of reporting indications based on the functioning of such inductive sensing units, and so on, should be regarded as applicable to such sensing units as installed on a lanyard keeper or on an anchorage, and are thus stipulated to be incorporated by reference at this location of this document for such purposes. Similarly, all of the discussions herein of equipping items with resonant-frequency-altering materials (e.g. ferrite materials) should be regarded as applicable to items such as connectors (e.g. hooks) and the like that may be detected, and distinguished, by an inductive-sensor-equipped lanyard keeper or anchorage. Such discussions are also incorporated by reference at this location of this document.

Exemplary Embodiments and Combinations

Embodiment 1 is a fall-protection apparatus configured to be used with a fall-protection harness that is wearable by a human user, the fall-protection apparatus comprising: at least one safety line; and, at least one connector, wherein the at least one connector comprises a resonant-frequency-shifting inductive sensing unit that is configured to detect whether the connector appears to be connected to a first item; and, if the connector is detected as appearing to be connected to the first item, to report a first indication; and, wherein the resonant-frequency-shifting inductive sensing unit is further configured to detect whether the connector appears to be connected to a second item that is different from the first item; and, if the connector is detected as appearing to be connected to the second item, to report a second indication that is different from the first indication. Embodiment 2 is the fall-protection apparatus of embodiment 1 wherein the at least one connector is a hook that is attached to an end of the safety line.

Embodiment 3 is the fall-protection apparatus of embodiment 1 wherein the fall-protection apparatus is a twin-leg fall-protection apparatus that is attachable to the fall-protection harness, wherein the twin-leg fall-protection apparatus comprises a first safety line to an end of which is attached a first hook comprising a first resonant-frequency-shifting inductive sensing unit, and a second safety line to an end of which is attached a second hook comprising a second resonant-frequency-shifting inductive sensing unit.

Embodiment 4 is the fall-protection apparatus of embodiment 3 wherein the twin-leg fall-protection apparatus is a twin-leg lanyard. Embodiment 5 is the fall-protection apparatus of embodiment 4 wherein the twin-leg lanyard comprises at least one shock absorber. Embodiment 6 is the fall-protection apparatus of embodiment 3 wherein the twin-leg fall-protection apparatus is a personal twin-leg self-retracting lifeline comprising a first brake configured to arrest motion of the first safety line and a second brake configured to arrest motion of the second safety line.

Embodiment 7 is the fall-protection apparatus of embodiment 2 wherein the resonant-frequency-shifting inductive sensing unit is configured to detect whether the hook appears to be connected to a first item that is an anchorage of a worksite, and is further configured to detect whether the hook appears to be connected to a second item that is a lanyard keeper of the fall-protection harness. Embodiment 8 is the fall-protection apparatus of embodiment 7 wherein the resonant-frequency-shifting inductive sensing unit is configured to detect whether the hook appears to be connected to an anchorage that is a generic structural item present at the worksite. Embodiment 9 is the fall-protection apparatus of embodiment 7 wherein the resonant-frequency-shifting inductive sensing unit is configured to detect whether the hook is connected to an anchorage that is a dedicated item that is installed at the worksite specifically for use with the fall-protection apparatus and that is detectable by the inductive sensing unit and that can be distinguished by the sensing unit from generic structural items present at the worksite.

Embodiment 10 is the fall-protection apparatus of embodiment 2 wherein the resonant-frequency-shifting inductive sensing unit is configured to detect whether the hook appears to be connected to a first item that is the safety line to an end of which the hook is attached, which safety line is wrapped around a structural component of a worksite and the hook connected thereto to form a tie-back anchorage; and, wherein the sensing unit is further configured to detect whether the hook appears to be connected to a second item that is a lanyard keeper of the fall-protection harness.

Embodiment 11 is the fall-protection apparatus of embodiment 2 wherein the fall-protection apparatus is a standard single-leg self-retracting lifeline comprising a brake configured to arrest motion of the safety line and wherein the resonant-frequency-shifting inductive sensing unit is configured to detect whether the hook appears to be connected to a first item that is a D-ring of the fall-protection harness.

Embodiment 12 is the fall-protection apparatus of embodiment 11 wherein the resonant-frequency-shifting inductive sensing unit is configured to detect whether the hook appears to be connected to a second item that is a docking station for the hook.

Embodiment 13 is the fall-protection apparatus of embodiment 1 wherein the fall-protection apparatus is a standard single-leg self-retracting lifeline comprising a brake configured to arrest motion of the safety line, wherein the at least one connector is configured to connect a housing of the self-retracting lifeline to a first item that is a first anchorage of a worksite, and wherein the resonant-frequency-shifting inductive sensing unit is configured to detect whether the connector appears to be connected to the first anchorage of the worksite.

Embodiment 14 is the fall-protection apparatus of embodiment 13 wherein the resonant-frequency-shifting inductive sensing unit is configured to detect whether the connector appears to be connected to a second anchorage of the worksite that is different from the first anchorage of the worksite.

Embodiment 15 is the fall-protection apparatus of any of embodiments 1-14 wherein the resonant-frequency-shifting inductive sensing unit is configured so that if the sensing unit does not detect that the connector appears to be connected to the first item or to the second item, the sensing unit will report a third indication that is different from the first indication and from the second indication.

Embodiment 16. is the fall-protection apparatus of any of embodiments 1-12 and 15 wherein the connector is a gated hook and wherein the connector further comprises a gate sensor; and, wherein the resonant-frequency-shifting inductive sensing unit comprises a gate-sensor-override function that is configured so that even if the inductive sensing unit ceases to detect that the connector appears to be connected to the first item or to the second item, the inductive sensing unit will continue to report the first indication or the second indication as long as the gate sensor shows that the gate appears to have remained closed since a previous detection that the connector appeared to be connected to the first item or to the second item. Embodiment 17 is a fall-protection system comprising the fall-protection apparatus of any of embodiments 1-16 connected to the fall-protection harness. Embodiment 18 is the fall-protection system of embodiment 17 wherein the second item is configured to include a resonant-frequency-altering material that causes the inductive sensing unit to observe a resonant frequency that is lower than a resonant frequency that would be observed in the absence of the resonant-frequency-altering material. Embodiment 19 is the fall-protection apparatus of embodiment 18 wherein the resonant-frequency-altering material is a ferrite material. Embodiment 20 is the fall-protection system of any of embodiments 18-19 wherein the second item is a lanyard keeper of the fall-protection harness.

Embodiment 21 is a method of monitoring the condition of a connector of a fall-protection system comprising at least one safety line and a fall-protection harness worn by a human user, the method comprising: detecting whether the connector appears to be connected to a first item, and, if the connector is detected as appearing to be connected to the first item, reporting a first indication; and, detecting whether the connector appears to be connected to a second item that is different from the first item, and, if the connector is detected as appearing to be connected to the second item, reporting a second indication that is different from the first indication, wherein the detecting is performed by a resonant-frequency-shifting inductive sensing unit. Embodiment 22 is the method of embodiment 21 wherein the first item is an anchorage and the second item is a lanyard keeper.

Embodiment 23 is a lanyard keeper mounted on a fall-protection harness that is wearable by a human user, the lanyard keeper comprising: a resonant-frequency-shifting inductive sensing unit that is configured to detect whether a first item appears to be parked on the lanyard keeper; and, if the first item is detected as appearing to be parked on the lanyard keeper, to report a first indication; and, wherein the resonant-frequency-shifting inductive sensing unit is further configured to detect whether a second item that is different from the first item appears to be parked on the lanyard keeper; and, if the second item is detected as appearing to be parked on the lanyard keeper, to report a second indication that is different from the first indication. Embodiment 24 is the lanyard keeper of embodiment 23 wherein the first item is a first connector of a fall-protection apparatus and the second item is a second, different connector of a second, different fall-protection system. Embodiment 25 is a fall-protection system comprising a fall-protection apparatus comprising at least one safety line with a connector that is connected to a D-ring, or parked on the lanyard keeper, of the fall-protection harness of embodiment 23.

Embodiment 26 is an anchorage configured to be used with a fall-protection apparatus comprising at least one safety line and at least one connector, the anchorage comprising: a resonant-frequency-shifting inductive sensing unit that is configured to detect whether a first item appears to be connected to the anchorage; and, if the first item is detected as appearing to be connected to the anchorage, to report a first indication; and, wherein the resonant-frequency-shifting inductive sensing unit is further configured to detect whether a second item that is different from the first item appears to be connected to the anchorage; and, if the second item is detected as appearing to be connected to the anchorage, to report a second indication that is different from the first indication.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and like terms), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein but to which no priority is claimed, this specification as written will control.

What is claimed is:

1. A fall-protection apparatus configured to be used with a fall-protection harness that is wearable by a human user, the fall-protection apparatus comprising:
at least one safety line;
and,
a connector,
wherein the connector comprises a resonant-frequency-shifting inductive sensing unit that is configured to detect whether the connector appears to be connected to a first item; the resonant-frequency-shifting inductive sensing unit being further configured so that if the connector is detected by the resonant-frequency-shifting inductive sensing unit as appearing to be connected to the first item, the resonant-frequency-shifting inductive sensing unit reports a first indication;
wherein the resonant-frequency-shifting inductive sensing unit is further configured to detect whether the connector appears to be connected to a second item that is different from the first item; the resonant-frequency-shifting inductive sensing unit being further configured so that if the connector is detected by the resonant-frequency-shifting inductive sensing unit as appearing to be connected to the second item, the resonant-frequency-shifting inductive sensing unit reports a second indication that is different from the first indication;
and,
wherein the connector is a gated hook and wherein the connector further comprises a gate sensor; and, wherein the resonant-frequency-shifting inductive sensing unit comprises a gate-sensor-override function that is configured so that even if the inductive sensing unit ceases to detect that the connector appears to be connected to the first item or to the second item, the inductive sensing unit will continue to report the first indication or the second indication as long as the gate sensor shows that the gate appears to have remained closed since a previous detection that the connector appeared to be connected to the first item or to the second item.

2. The fall-protection apparatus of claim 1 wherein the connector is attached to an end of the at least one safety line.

3. The fall-protection apparatus of claim 1 wherein the gated hook is a first gated hook and the resonant-frequency-shifting inductive sensing unit is a first resonant-frequency-shifting inductive sensing unit, wherein the fall-protection apparatus further comprises a second gated hook comprising a second resonant-frequency-shifting inductive sensing unit, wherein the fall-protection apparatus is a twin-leg fall-protection apparatus that is attachable to the fall-protection harness, wherein the at least one safety line of the twin-leg fall-protection apparatus comprises a first safety line to an end of which is attached the first gated hook, and a second safety line to an end of which is attached the second gated hook.

4. The fall-protection apparatus of claim 3 wherein the twin-leg fall-protection apparatus is a twin-leg lanyard.

5. The fall-protection apparatus of claim 4 wherein the twin-leg lanyard comprises at least one shock absorber.

6. The fall-protection apparatus of claim 3 wherein the twin-leg fall-protection apparatus is a personal twin-leg Self-Retracting Lifeline (SRL) comprising a first friction brake configured to arrest motion of the first safety line and a second friction brake configured to arrest motion of the second safety line.

7. The fall-protection apparatus of claim 1 wherein the resonant-frequency-shifting inductive sensing unit is configured so that if the sensing unit does not detect that the connector appears to be connected to the first item or to the second item, the sensing unit will report a third indication that is different from the first indication and from the second indication.

8. A fall-protection system comprising the fall-protection apparatus of claim 1 connected to the fall-protection harness.

9. A method of monitoring the condition of the gated hook of the fall-protection apparatus of claim 1, the method comprising:

providing the fall-protection apparatus of claim 1;

detecting whether the gated hook appears to be connected to the first item, and, if the gated hook is detected as appearing to be connected to the first item, reporting the first indication; and, detecting whether the gated hook appears to be connected to the second item that is different from the first item, and, if the gated hook is detected as appearing to be connected to the second item, reporting the second indication that is different from the first indication, wherein the detecting is performed by the resonant-frequency-shifting inductive sensing unit.

10. The method of claim 9 wherein the first item is an anchorage of a worksite and the second item is a lanyard keeper of the fall-protection harness.

11. The method of claim 10 wherein the anchorage is a generic structural item present at the worksite.

12. The method of claim 10 wherein the anchorage is a dedicated item that is installed at the worksite specifically for use with the fall-protection apparatus and that is detectable by the resonant-frequency-shifting inductive sensing unit and that can be distinguished by the resonant-frequency-shifting sensing unit from generic structural items present at the worksite.

13. The method of claim 10 wherein the first item is the safety line to an end of which the gated hook is attached, which safety line is wrapped around a structural component of the worksite and the gated hook connected thereto to form a tie-back anchorage.

14. The method of claim 9 wherein the fall-protection apparatus is a standard single-leg self-retracting lifeline comprising a brake configured to arrest motion of the safety line and wherein the first item is a D-ring of the fall-protection harness.

15. The method of claim 14 wherein the second item is a docking station for the gated hook.

16. The method of claim 9 wherein the second item includes a resonant-frequency-altering material that causes the resonant-frequency-shifting inductive sensing unit to observe a resonant frequency that is lower than a resonant frequency that would be observed in the absence of the resonant-frequency-altering material.

17. The method of claim 16 wherein the resonant-frequency-altering material is a ferrite material.

18. The method of claim 16 wherein the second item is a lanyard keeper of the fall-protection harness.

\* \* \* \* \*